United States Patent Office 3,254,562
Patented June 7, 1966

3,254,562
PROCESS FOR POLARIZING ULTRAVIOLET LIGHT UTILIZING ORIENTED, POLYPHENYL STAINED FILM
Elkan R. Blout, Belmont, and George R. Bird, Concord, Mass., assignors to Polaroid Corporation, Cambridge, Mass., a corporation of Delaware
No Drawing. Filed Oct. 26, 1961, Ser. No. 147,756
4 Claims. (Cl. 88—65)

The present invention is concerned with polarizers and more particularly with polarizers which are useful in the ultraviolet light regions.

One object of the present invention is to provide polarizers which are useful for polarizing ultraviolet light.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description.

In the past, satisfactory visible polarizers have been prepared by staining molecularly oriented, polymeric films with a dichroic stain, such, for example, as iodine. Such polarizers, although useful in the visible regions of the spectrum, leave much to be desired in the ultraviolet regions.

It has been found in the present invention that useful ultraviolet polarizers may be prepared by staining molecularly oriented, polymeric films with polyphenyls, especially with hydroxy-substituted polyphenyls and, more preferably, with dihydroxy-substituted polyphenyls. The preferred dihydroxy-substituted polyphenyls are those in which the hydroxy substituents are located in the para positions of the terminal phenyl groups. Polyphenyls, comprising 2 to 4 phenyl radicals, have been found especially useful. As examples of useful compounds, mention may be made of;

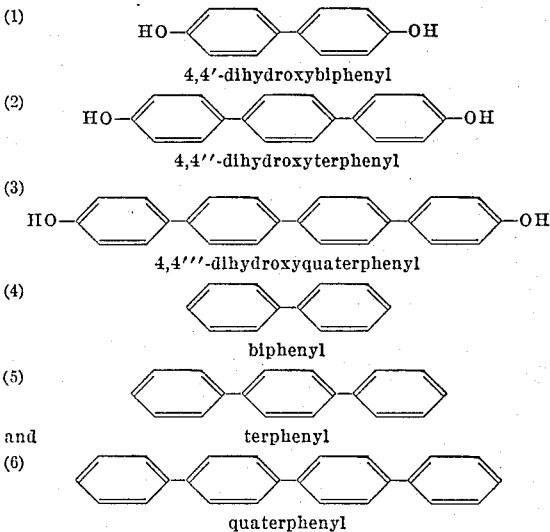

Especially useful results have been obtained with 4,4''-dihydroxyterphenyl.

In the polarizers of this invention, the polymeric film, unless it has dichroic properties itself, generally serves as a matrix upon which the dichroic materials may be ordered. As will be understood, a wide range of polymeric materials are available for such use. The preferred polymeric materials are those which (1) are readily orientable, e.g., by stretching, (2) transmit ultraviolet light, and (3) have an affinity for the polyphenyls, e.g., dyeable by or having mordanting properties for such polyphenyls. When desired, the polymeric materials may also possess dichroic properties in and of themselves. As examples of useful polymeric materials, mention may be made of polyvinyl ketone, polyvinyl alcohol, derivatives of polyvinyl alcohol and polyhydrocarbons, e.g., polyethylene and polypropylene.

In an especially useful embodiment of this invention, polyvinyl alcohol or a derivative of polyvinyl alcohol is used as the polymeric material. For the purposes of this invention, derivatives of polyvinyl alcohol are polymers which, through hydrolysis, are converted to polyvinyl alcohol. As examples of such derivatives, mention may be made of the organic acid esters and acetals of polyvinyl alcohol. The preferred derivatives are those in which only a portion of the hydroxy groups are modified.

In a preferred mode of preparing polarizers within the scope of this invention, a sheet of polymeric material, such for example as polyvinyl alcohol, is first stretched to orient the molecules therein. The degree of stretch may vary considerably, depending upon the purpose to which the sheet is to be put. Generally, a stretch of four or five times its initial length is quite satisfactory. The oriented sheet is then stained with a polyphenyl. Generally, the staining is carried out by immersing the oriented film in a bath containing the desired polyphenyl. The solvent used in the staining bath may be varied depending upon the particular polyphenyls and the particular polymeric material used as the matrix. Particularly useful solvents are those which will slightly swell the film and thus provide intimate contact between the polyphenyl and the film. The amount of polyphenyl used in the staining bath can generally be varied to suit particular needs. When water was used as the solvent, baths containing as little as 0.05 parts per 100, by weight, of the polyphenyls, produced an effective polarizer.

In a further mode of preparing the polarizers within the scope of this invention, the film may be stained first with the polyphenyl and then oriented.

The hydroxy-substituted polyphenyls which, as set forth above, are especially useful, may be prepared from the polyphenyls by sulfonating the polyphenyls and fusing the resulting sulfonate with alkali. The sulfonation reaction will generally proceed readily by using about a 50% excess of concentrated sulfuric acid.

The following nonlimiting examples illustrate the preparation of polarizers within the scope of the present invention:

*Example 1*

A film of polyvinyl alcohol (about 2 mils) was stretched to about four times its initial length and imbibed in a staining bath. The staining bath comprised a saturated solution of 4,4''-dihydroxyterphenyl in acetone and water (1 to 20 by volume). The imbibed film was restretched to 110% of its initial stretched length, air dried and slightly baked. The resulting polarizer had a dichroic ratio of about 6 to 8 in the 300 m$\mu$±40 m$\mu$ spectral region.

*Example 2*

A 2 mil film of polyvinyl alcohol was stretched to about four times its initial length and imbibed in a staining bath for about 2 minutes. The staining bath comprised 0.107 gm. of 4,4'''-dihydroxyquaterphenyl dissolved in 200 cc. of water and 8 cc. of a 10% sodium hydroxide solution. The stained film was restretched to 120% of its initial stretched length and dried. The resulting polarizer exhibited a dichroic ratio of about 4 at 360 m$\mu$.

If the polarizer was subsequently rinsed in a weak acid solution, it exhibited a maximum dichroic ratio of about 2 at 325 mμ. Rinsing the polarizer with an alkaline solution returned the maximum dichroic ratio to about the same wave length and magnitude.

*Example 3*

A polarizer was prepared as in Example 1, except that the staining bath comprised a saturated solution of 4,4'-dihydroxybiphenyl. The resulting polarizer exhibited a dichroic ratio of about 3.5 at 260 mμ.

*Example 4*

A 1 mil film of polypropylene was immersed in a saturated solution of biphenyl in hexane for about ½ to 1 hour. The film was removed from the hexane bath and cold stretched to the limit of its extension. The resulting polarizer exhibited a dichroic ratio of 1.5 at 250 mμ.

*Example 5*

A polarizer was prepared as in Example 4 except that a saturated solution of terphenyl was used in place of the biphenyl. The polarizer had a dichroic ratio of 1.6 at 275 mμ.

*Example 6*

A polarizer was prepared as in Example 4 except that a saturated solution of quaterphenyl was used in place of the biphenyl. The resulting polarizer had a dichroic ratio of 2.2 at 280–290 mμ.

*Example 7*

A 1 mil film of polyethylene was immersed for about ½ to 1 hour in a saturated solution of 4,4'-dihydroxybiphenyl in hexane. The film was removed from the hexane bath and cold stretched to the limit of its extension. The resulting polarizer exhibited a dichroic ratio of 1.5 at 280–290 mμ.

As mentioned above, the preferred polyphenyls for use in this invention are the hydroxy-substituted compounds. The presence of 1 or more of such hydroxy groups in the molecule serves to make the polyphenyls more compatible with hydrophilic films. When desired, other hydrophilic substituents may be used in place of the hydroxy groups for this purpose.

It should be understood that the polyphenyls for use in this invention may be substituted by groups other than hydrophilic groups.

When it is desired to use substituted polyphenyls, the substituents should preferably be placed in the para positions of the terminal phenyl radicals in order to facilitate the orientation of such molecules. When the substituents are not placed in the para positions of the terminal phenyl groups, they should, preferably, be (1) used in pairs, (2) substituted in the same phenyl radical, and (3) be symmetrically (in relation to the linear plane of the polyphenyls) placed on such radical. As an example of such symmetrical substitution, mention may be made of the chloro substituents in 3,5-dichlorobiphenyl i.e.,

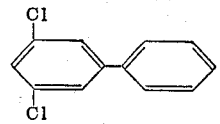

Since certain changes may be made in the above product without departing from the scope of the invention herein involved, it is intended that all matter contained in the above description shall be interpreted as illustrative and not in a limiting sense.

What is claimed is:

1. A process for polarizing ultraviolet light, said process comprising molecularly orienting and staining an ultraviolet light-transmitting polymeric film with a polyphenyl, said polymeric film being selected from the group consisting of polyvinyl alcohol, derivatives of polyvinyl alcohol and polyhydrocarbons, said polyphenyl being selected from the group consisting of biphenyl, terphenyl, quaterphenyl, p,p'-dihydroxybiphenyl, p,p''-dihydroxyterphenyl and p,p'''-dihydroxyquaterphenyl, and directing ultraviolet light through said film.

2. A process as defined in claim 1 wherein said film is polyvinyl alcohol.

3. A process as defined in claim 2 wherein said polyphenyl is 4,4'''-dihydroxyquaterphenyl.

4. A process as defined in claim 1 wherein said film is a polyhydrocarbon.

References Cited by the Examiner

UNITED STATES PATENTS

| 2,328,903 | 9/1943 | Heymann | 8—4 |
| 2,505,085 | 4/1950 | Amon et al. | 88—65 |
| 2,997,390 | 8/1961 | Land. | |

OTHER REFERENCES

Barer, "Some Experiments With Polarizing Films in the Ultra-Violet," article in Journal of Scientific Instruments, vol. 26, 1949, pp. 325–327.

Chemical Society Journal, Chau et al., Pt. 3, 1959 edition, pp. 2666–75.

Pesteil, "Optique Cristalline," article in Compte Rendus, vol. 235, October–December 1952, pp. 1384 and 1385.

Tetrahedron, Brocklehurst et al., vol. 9–10, 1960, pp. 102–108.

References Cited by the Applicant

UNITED STATES PATENTS 2,980,964   4/1961   Dilke.

DAVID H. RUBIN, *Primary Examiner.*

JEWELL H. PEDERSEN, *Examiner.*

J. S. GOLDHAMMER, *Assistant Examiner.*